United States Patent Office

3,052,716
Patented Sept. 4, 1962

3,052,716
PRODUCTION OF CHLOROCYCLOHEXANECAR-
BOXYLIC ACID
Emil F. Jason and Ellis K. Fields, Chicago, Ill., assignors
to Standard Oil Company, Chicago, Ill., a corporation
of Indiana
No Drawing. Filed Nov. 6, 1959, Ser. No. 851,221
10 Claims. (Cl. 260—514)

This invention relates to the preparation of chlorocyclohexanecarboxylic acid, and particularly to alpha-chlorocyclohexanecarboxylic acid.

Chlorinated cyclohexanecarboxylic acids may be employed in the preparation of alkyd resins, plasticizers and pesticides. Also, the chlorinated acids are readily dehydrohalogenated to the corresponding unsaturated acids which serve as attractive intermediates for a variety of chemical products. However, the chlorination of cyclohexanecarboxylic acid ordinarily results in the formation of different isomeric forms of monochloro acid and in the more highly chlorinated compounds, such as the dichloro acid. Particularly in the production of certain chemical intermediates it is desirable to produce alpha-chlorocyclohexanecarboxylic acid for use as a starting compound. However, the difficulty of separating the alpha-oriented acid from the other by-product acids and the low yield of the alpha-oriented acid are disadvantageous. One method for preparing alpha-chlorocyclohexanecarboxylic acid has been reported in Ann. 453, 113 (1927). This method involves the reaction of the ethyl amide of cyclohexane with phosphorus pentachloride in a benzene solvent, with subsequent hydrolysis with heated HCl, followed by distillation to separate the acid. This method involves rather severe reaction conditions and results in the formation of other by-products.

An object of the invention is a process for the preparation of alpha-chlorocyclohexanecarboxylic acid utilizing economical and readily available starting materials. Another object is a process resulting in a relatively high yield of alpha-chlorocyclohexanecarboxylic acid, with the formation of a minimum of by-product acids. A further object is a process for the production of alpha-chlorocyclohexanecarboxylic acid under mild conditions involving relatively inexpensive processing equipment. Other objects will become apparent in the course of the detailed description of the invention.

We have discovered that cyclohexanemonocarboxylic acid can be chlorinated to give high yields of monochlorocyclohexanecarboxylic acids which consist almost entirely of alpha-chlorocyclohexanecarboxylic acid. The process of the invention is carried out by chlorinating cyclohexanecarboxylic acid in a liquid medium with a chlorinating agent at a temperature of between about 0° C. and about 150° C. in the presence of a catalyst. Among the catalysts which may be used in the process are the chlorides, oxyhalides, oxides and oxygen acids of the elements phosphorus, antimony and arsenic.

There are a number of known chlorinating agents which may be used in the practice of the invention. Among these are chlorine, phosphorus pentachloride, sulfuryl chloride, N-chlorosuccinimide, N-chlorourea and dichlorohydantoin. However, chlorine gas is the preferred chlorinating agent since it is readily available and does not involve the formation of undesirable by-products. When using chlorine as the chlorinating agent it is preferred to continuously bubble chlorine gas through the liquid cyclohexanecarboxylic acid during the course of the reaction. When using other chlorinating agents they may be added either continuously, all at once or incrementally while the reaction is proceeding. It is desirable to convert a maximum amount of the cyclohexanecarboxylic acid to its monochloro derivative. In this case the amount of chlorinating agent used should be sufficient to provide ample chlorine for the reaction, and may be considerably in excess of the amount required for total theoreical chlorination. In order to prevent the formation of excessive amounts of polychlorinated acid the usage should be no more than about 150% of the amount of chlorine required for total theoretical chlorination. In the latter instance the reaction product mixture will contain some polychlorinated acid. However, the reaction may be stopped at any time, and any substantial amount of the cyclohexanecarboxylic acid may be converted to the chloro acid. In this instance lesser quantities of chlorinating agent may be used to provide as little as about 20% of the amount of chlorine required for total theoretical chlorination. Preferably, an amount of chlorinating agent is selected to provide chlorine for between about 70% and 120% of the total theoretical chlorination.

It is preferred to conduct the reaction in a liquid medium. This may involve only molten cyclohexanecarboxylic acid when operating at temperatures above the melting point of the acid. However, a solvent may be used, particularly at temperatures below the melting point of the acid. Solvents which may be used for this purpose are the chlorinated hydrocarbons, either aromatic or aliphatic, and having either one or two carbon atoms per molecule. Certain other hydrocarbons not susceptible to chlorination may also be used. Among the solvents which may be used for this purpose are carbon tetrachloride, chloroform, chlorobenzene and benzene, with carbon tetrachloride as the preferred solvent.

The process may be carried out at a temperature in the range of about 0° C. to about 150° C., and preferably between temperatures of about 30° C. and about 100° C. As mentioned previously, where the process is carried out at temperatures below the melting point of cyclohexanecarboxylic acid, a solvent for the acid may be used.

Catalysts which may be employed in this process are the chlorides, oxyhalides, oxides and oxygen acids of the elements phosphorus, antimony and arsenic, with phosphorus trichloride as the preferred catalyst. It is preferred to add the catalyst to the cyclohexanecarboxylic acid at the start of the reaction and to thoroughly mix the reactants. The amount of catalyst used will vary according to the particular catalyst, the temperature and other conditions. It is to be understood that any catalytically effective amount of the catalyst is within the scope of the invention. Generally, the amount of catalyst which may be employed will be between about 0.01 weight percent and about 10 weight percent of cyclohexanecarboxylic acid, and preferably the catalyst usage is between about 1 weight percent and about 5 weight percent.

The process has been found to result in a yield of about 75 mole percent of alpha-chlorocyclohexanecarboxylic acid which acid may be separated from the unreacted starting materials, other isomers and polychlorinated products by distillation, crystallization, chromatographic means or selective adsorbents. Distillation is preferred as the means of separation. Because of the relatively low temperatures and pressures involved the process may be conducted in conventional equipment. The progress of the reaction can easily be followed by a titration procedure, or by observing the weight increase during the reaction.

The following example of the process and comparison test with a normal chlorination procedure serves as an illustration of the manner in which the principle of the invention may be practiced. However, it is to be understood that this does not serve as a limitation on the invention, but is merely an example.

Example

A 256 g. (2.0 mols) sample of cyclohexanecarboxylic acid was mixed with 8.0 g. of phosphorus trichloride and the mixture was heated to 97° C. as stirring was effected. To the stirred heated mixture chlorine gas was passed through until a gain in weight of 76 g. was observed (6 hours). The reaction mixture was slowly distilled through a 12 inch Vigreux column and a 70-75% yield of alpha-chlorocyclohexanecarboxylic acid was obtained as a water-white oil; boiling point 110-115° C./0.6 mm. The oil slowly solidified into a white mass; melting point 51-53° C.

Analysis.—Calculated for $C_7H_{11}ClO_2$: C, 51.72; H, 6.76. Experimental: C, 52.35; H, 6.75.

An amide of alpha-chlorocyclohexanecarboxylic acid was prepared in the normal fashion; melting point 113-114° C.

Analysis.—Calculated for $C_7H_{12}NOCl$: C, 52.04; H, 7.47. Experimental: C, 51.90; H, 7.57.

Comparison Test

Chlorine gas was bubbled through 287.2 g. (2.170 moles) of cyclohexanecarboxylic acid at room temperature (25° C.) until 68 g. of chlorine had been absorbed (11 hours). The chlorinated mixture was dissolved in ether and washed twice with 75 ml. portions of water. The ethereal solution was dried and distilled giving a 77% yield of monochlorocyclohexanecarboxylic acid as a colorless oil; boiling point 115-120° C./0.5 mm.; $n_D^{20}$ 1.4942.

Analysis.—Calculated for $C_7H_{11}ClO_2$: C, 51.72; H, 6.76. Experimental: C, 51.65; H, 6.90. Calculated molecular weight: 162.4. Experimental: 161±5.

Thus, the yield of this process may be compared to a conventional chlorination process carried out in the absence of a catalyst wherein a 77% yield of the randomly oriented monochlorocyclohexanecarboxylic acid was obtained, while the yield of the process of the invention resulted in about 75 mole percent of alpha-chlorocyclohexanecarboxylic acid.

Having described our invention what we claim is:

1. A process for the preparation of alpha-chlorocyclohexanecarboxylic acid which process comprises contacting cyclohexanecarboxylic acid in the liquid phase with a chlorinating agent at a temperature of between about 0° C. and about 150° C. in the presence of a catalytically effective amount of a material selected from the group consisting of chlorides, oxyhalides, oxides and oxygen acids of the elements phosphorus, antimony and arsenic and separating alpha chlorocyclohexanecarboxylic acid.

2. The process of claim 1 wherein said chlorinating agent is selected from the group consisting of chlorine, sulfuryl chloride, phosphorus pentachloride, N-chlorosuccinimide, N-chlorourea and dichlorohydantoin.

3. The process of claim 1 wherein said agent is chlorine.

4. The process of claim 1 wherein said catalyst is phosphorus trichloride.

5. The process of claim 1 wherein said catalyst is present in an amount between about 1 weight percent and about 5 weight percent of said cyclohexanecarboxylic acid.

6. The process of claim 1 wherein said reaction temperature is between about 30° C. and about 100° C.

7. A process for the preparation of alpha-chlorocyclohexanecarboxylic acid which process comprises contacting cyclohexanecarboxylic acid in the liquid phase with a chlorinating agent selected from the group consisting of chlorine, sulfuryl chloride, phosphorus pentachloride, N-chlorosuccinimide, N-chlorourea and dichlorohydantoin, at a temperature between about 30° C. and about 100° C. and in the presence of about 1 percent to about 5 percent by weight of a material selected from the group consisting of chlorides, oxyhalides, oxides and oxygen acids of the elements phosphorus, antimony and arsenic and separating alpha chlorocyclohexanecarboxylic acid.

8. The process of claim 7 wherein said agent is chlorine.

9. The process of claim 7 wherein said catalyst is phosphorus trichloride.

10. A process for the preparation of alpha-chlorocyclohexanecarboxylic acid which process comprises contacting liquid cyclohexanecarboxylic acid with chlorine, said chlorine being added in an amount between about 70% and about 120% of that required for total theoretical chlorination, said process being conducted at a temperature of between about 30° C. and about 100° C. and in the presence of about 1 percent to about 5 percent by weight of phosphorus trichloride and separating alpha chlorocyclohexanecarboxylic acid.

References Cited in the file of this patent

Surrey: "Name Reactions in Organic Chemistry," 1954, pp. 94-95.